United States Patent
Wu et al.

(10) Patent No.: US 10,045,263 B2
(45) Date of Patent: Aug. 7, 2018

(54) NETWORK SWITCHING METHOD AND TERMINAL DEVICE

(71) Applicant: Huawei Technologies Co., Ltd., Shenzhen (CN)

(72) Inventors: Hao Wu, Shenzhen (CN); Kangmin Huang, Shenzhen (CN); Mingjie Dong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 38 days.

(21) Appl. No.: 14/988,956

(22) Filed: Jan. 6, 2016

(65) Prior Publication Data

US 2016/0119833 A1 Apr. 28, 2016

Related U.S. Application Data

(63) Continuation of application No. PCT/CN2014/093453, filed on Dec. 10, 2014.

(30) Foreign Application Priority Data

Dec. 10, 2013 (CN) .......................... 2013 1 0671763

(51) Int. Cl.
- *H04W 36/00* (2009.01)
- *H04W 36/14* (2009.01)
- *H04W 88/06* (2009.01)

(52) U.S. Cl.
CPC ... *H04W 36/0072* (2013.01); *H04W 36/0083* (2013.01); *H04W 36/14* (2013.01); *H04W 88/06* (2013.01)

(58) Field of Classification Search
CPC ............. H04W 36/0072; H04W 36/14; H04W 36/0083; H04W 88/06
See application file for complete search history.

(56) References Cited

U.S. PATENT DOCUMENTS

2003/0204599 A1 10/2003 Trossen et al.
2004/0170122 A1* 9/2004 Guo ...................... H04W 36/30
                                                          370/210

(Continued)

FOREIGN PATENT DOCUMENTS

CN     101237393 A     8/2008
CN     101409900 A     4/2009

(Continued)

OTHER PUBLICATIONS

Foreign Communication From a Counterpart Application, PCT Application No. PCT/CN2014/093453, English Translation of International Search Report dated Mar. 4, 2015, 2 pages.

(Continued)

*Primary Examiner* — Steven Kelley
(74) *Attorney, Agent, or Firm* — Conley Rose, P.C.

(57) ABSTRACT

A network switching method and a terminal device, which relate to the field of communications technologies, includes acquiring a network resource parameter of a network allowed to be accessed, and determining, from the network allowed to be accessed and according to the network resource parameter of the network allowed to be accessed, a target network to be switched to and a network resource parameter of the target network, where the network resource parameter of the target network is used to determine and set a running parameter of an application program that is to be run in the target network, and switching from a current network to the target network, and running the application program in the target network. The solutions can be used to enable the application program to implement, to some extent, seamless network switching.

12 Claims, 5 Drawing Sheets

(56) References Cited

U.S. PATENT DOCUMENTS

| | | | |
|---|---|---|---|
| 2007/0021971 A1* | 1/2007 | McKinney | G06Q 10/06 455/456.1 |
| 2007/0223408 A1 | 9/2007 | Thielke et al. | |
| 2008/0049755 A1 | 2/2008 | Gannon et al. | |
| 2008/0146258 A1* | 6/2008 | Testone | H04W 8/06 455/466 |
| 2010/0131663 A1* | 5/2010 | Lee | H04L 29/12216 709/228 |
| 2010/0195608 A1 | 8/2010 | Ishizu et al. | |
| 2011/0255512 A1 | 10/2011 | Lee et al. | |
| 2011/0310851 A1* | 12/2011 | Klingenbrunn | H04W 76/041 370/332 |
| 2012/0281062 A1 | 11/2012 | Gu et al. | |
| 2012/0296964 A1* | 11/2012 | Chaturvedi | H04M 3/562 709/204 |
| 2013/0217357 A1* | 8/2013 | Menezes | H04W 4/26 455/406 |
| 2014/0112318 A1 | 4/2014 | Zhou et al. | |
| 2015/0055490 A1* | 2/2015 | Patil | H04W 24/08 370/252 |
| 2017/0083366 A1 | 3/2017 | Gou et al. | |

FOREIGN PATENT DOCUMENTS

| | | |
|---|---|---|
| CN | 101640895 A | 2/2010 |
| CN | 102137248 A | 7/2011 |
| CN | 102143544 A | 8/2011 |
| CN | 102202355 A | 9/2011 |
| CN | 103118188 A | 5/2013 |
| EP | 1622314 A1 | 2/2006 |
| EP | 2635069 A1 | 9/2013 |
| JP | 2010183375 A | 8/2010 |
| JP | 2014531881 A | 11/2014 |
| KR | 20130088451 A | 8/2013 |
| WO | 2007063901 A1 | 6/2007 |
| WO | 2010100315 A1 | 9/2010 |
| WO | 2013075436 A1 | 5/2013 |

OTHER PUBLICATIONS

Foreign Communication From a Counterpart Application, PCT Application No. PCT/CN2014/093453, English Translation of Written Opinion dated Mar. 4, 2015, 7 pages.

Foreign Communication Form a Counterpart Application, European Application No. 14870020.6, Extended European Search Report dated Jul. 21, 2016, 9 pages.

Foreign Communication From a Counterpart Application, Korean Application 20167017176, Korean Office Action dated Feb. 23, 2017, 7 pages.

Foreign Communication From a Counterpart Application, Korean Application 20167017176, English Translation of Korean Office Action dated Feb. 23, 2017, 5 pages.

Foreign Communication From a Counterpart Application, European Application No. 14870020.6, European Office Action dated Jan. 2, 2018, 7 pages.

Machine Translation and Abstract of Chinese Publication No. CN101409900, Apr. 15, 2009, 8 pages.

Machine Translation and Abstract of Chinese Publication No. CN102202355, Sep. 28, 2011, 22 pages.

Machine Translation and Abstract of International Publication No. WO2007063901, Jun. 7, 2007, 11 pages.

Foreign Communication From a Counterpart Application, Japanese Application No. 2016-535667, Japanese Office Action dated Jul. 25, 2017, 3 pages.

Foreign Communication From a Counterpart Application, Japanese Application No. 2016-535667, English Translation of Japanese Office Action dated Jul. 25, 2017, 5 pages.

Foreign Communication From a Counterpart Application, Chinese Application No. 201310671763.4, Chinese Search Report dated Aug. 11, 2017, 2 pages.

Foreign Communication From a Counterpart Application, Chinese Application No. 201310671763.4, Chinese Office Action dated Aug. 21, 2017, 8 pages.

* cited by examiner

NETWORK SWITCHING METHOD AND TERMINAL DEVICE

CROSS-REFERENCE TO RELATED APPLICATIONS

This application is a continuation of International Application No. PCT/CN2014/093453, filed on Dec. 10, 2014, which claims priority to Chinese Patent Application No. 201310671763.4, filed on Dec. 10, 2013, both of which are hereby incorporated by reference in their entireties.

TECHNICAL FIELD

The present disclosure relates to the field of wireless communications technologies, and in particular, to a network switching method and a terminal device.

BACKGROUND

At present, a wireless mobile communications network in which multiple radio access technologies and standards are complementary provides a ubiquitous information communications service for a user, and a user terminal can be freely switched between multiple different wireless mobile communications networks. In a wireless communications system, when moving from a current network in which the user terminal is located to a target network, the user terminal needs to perform network switching, where the target network refers to a next communications network to which the user terminal moves. In the prior art, after network switching occurs, an application program that is run on the user terminal and needs to perform network communication is run according to a network status of the target network by using a parameter that adapts to the network status. This switching manner usually causes that the application program that is run on the user terminal and needs to perform network communication is not smoothly switched.

SUMMARY

Embodiments of the present disclosure provide a network switching method and a terminal device, which are used to enable an application program that is run on the terminal device to implement, to some extent, seamless network switching.

According to a first aspect, an embodiment of the present disclosure provides a network switching method, where the method includes, before network switching is performed, acquiring a network resource parameter of a network allowed to be accessed, determining, from the network allowed to be accessed and according to the network resource parameter of the network allowed to be accessed, a target network to be switched to and a network resource parameter of the target network, where the network resource parameter of the target network is used to determine and set a running parameter of an application program that is to be run in the target network, and switching from a current network to the target network, and starting or continuing running the application program in the target network.

With reference to the first aspect, in a first implementation manner, before the switching from a current network to the target network, the method further includes, determining and setting, according to the network resource parameter of the target network, the running parameter of the application program that is to be run in the target network, and running the application program, and after switching from the current network to the target network, continuing running the application program in the target network.

With reference to the first aspect or a first implementation manner of the first aspect, in a second implementation manner, the running parameter of the application program includes resolution, and the determining and setting, according to the network resource parameter of the target network, the running parameter of the application program that is to be run in the target network includes, determining and setting, according to the network resource parameter of the target network, the resolution of the application program that is to be run in the target network, where the application program includes a video type application that uses network communications.

With reference to the first aspect or a first implementation manner of the first aspect, in a third implementation manner, the running parameter of the application program includes a heartbeat period, and the determining and setting, according to the network resource parameter of the target network, the running parameter of the application program that is to be run in the target network includes, determining and setting, according to the network resource parameter of the target network, the heartbeat period of the application program that is to be run in the target network.

With reference to the first aspect or a first implementation manner of the first aspect, in a fourth implementation manner, the network resource parameter includes network quality, bandwidth, or a network charge rate, and the determining and setting, according to the network resource parameter of the target network, the running parameter of the application program that is to be run in the target network includes, determining and setting, according to the network quality of the target network, the running parameter of the application program that is to be run in the target network, or determining and setting, according to the bandwidth of the target network, the running parameter of the application program that is to be run in the target network, or determining and setting, according to the network charge rate of the target network, the running parameter of the application program that is to be run in the target network.

With reference to the first aspect, the first implementation manner of the first aspect, the second implementation manner of the first aspect, the third implementation manner of the first aspect, or the fourth implementation manner of the first aspect, in a fifth implementation manner, the method further includes, establishing a network connection between the application program and a network server in the target network.

With reference to the first aspect, the first implementation manner of the first aspect, the second implementation manner of the first aspect, the third implementation manner of the first aspect, the fourth implementation manner of the first aspect, or the fifth implementation manner of the first aspect, in a sixth implementation manner, the acquiring a network resource parameter of a network allowed to be accessed includes, self-detecting and acquiring the network resource parameter of the network allowed to be accessed; or receiving the network resource parameter that is of the network allowed to be accessed and is sent by a network management device, or receiving the network resource parameter that is of the network allowed to be accessed and is sent by a terminal device of a communication peer.

With reference to the first aspect, the first implementation manner of the first aspect, the second implementation manner of the first aspect, the third implementation manner of the first aspect, the fourth implementation manner of the first aspect, the fifth implementation manner of the first aspect, or the sixth implementation manner of the first aspect, in a seventh implementation manner, the determining, from the network allowed to be accessed and according to the network resource parameter of the network allowed to be accessed, a target network to be switched to includes, the network resource parameter includes bandwidth, a network charge rate, or network stability, determining, from the network allowed to be accessed and according to the bandwidth of the network allowed to be accessed, a network with largest bandwidth as the target network to be switched to; or determining, from the network allowed to be accessed and according to the network charge rate of the network allowed to be accessed, a network with a lowest charge as the target network to be switched to, or determining, from the network allowed to be accessed and according to the network stability of the network allowed to be accessed, a network with highest stability as the target network to be switched to.

According to a second aspect, an embodiment of the present disclosure provides a switching notifying method, where the method includes, before network switching, acquiring a network resource parameter of a network allowed to be accessed; determining, from the network allowed to be accessed and according to the network resource parameter of the network allowed to be accessed, a target network to be switched to, sending a network resource parameter of the target network to a specified terminal device, so that the specified terminal device determines, according to the network resource parameter, a running parameter of an application program that is run on the terminal device, and switching from current network to the target network.

With reference to the second aspect, in a first implementation manner, the acquiring a network resource parameter of a network allowed to be accessed includes, self-detecting and acquiring the network resource parameter of the network allowed to be accessed, or receiving the network resource parameter that is of the network allowed to be accessed and is sent by a network management device.

With reference to the second aspect or the first implementation manner of the second aspect, in a second implementation manner, the determining, from the network allowed to be accessed and according to the network resource parameter of the network allowed to be accessed, a target network to be switched to includes, the network resource parameter includes bandwidth, a network charge rate, or network stability, determining, from the network allowed to be accessed and according to the bandwidth of the network allowed to be accessed, a network with largest bandwidth as the target network to be switched to, or determining, from the network allowed to be accessed and according to the network charge rate of the network allowed to be accessed, a network with a lowest charge as the target network to be switched to, or determining, from the network allowed to be accessed and according to the network stability of the network allowed to be accessed, a network with highest stability as the target network to be switched to.

According to a third aspect, an embodiment of the present disclosure further provides a terminal device, where the terminal device includes an acquiring unit configured to, before network switching is performed, acquire a network resource parameter of a network allowed to be accessed, a determining unit configured to determine, from the network allowed to be accessed and according to the network resource parameter of the network allowed to be accessed, a target network to be switched to and a network resource parameter of the target network, where the network resource parameter of the target network is used to determine and set a running parameter of an application program that is to be run in the target network, and a switching unit configured to switch from a current network to the target network, and a running unit configured to start or continue running the application program in the target network.

With reference to the third aspect, in a first implementation manner, before switching from the current network to the target network, the determining unit is further configured to determine and set, according to the network resource parameter of the target network, the running parameter of the application program that is to be run in the target network and the running unit is further configured to run the application program, and after switching from the current network to the target network, the running unit is further configured to continue running the application program in the target network.

With reference to the third aspect or the first implementation manner of the third aspect, in a second implementation manner, the running parameter of the application program includes resolution, and the determining unit is further configured to determine and set, according to the network resource parameter of the target network, the resolution of the application program that is to be run in the target network, where the application program includes a video type application that uses network communications.

With reference to the third aspect or the first implementation manner of the third aspect, in a third implementation manner, the running parameter of the application program includes a heartbeat period, and the determining unit is further configured to determine and set, according to the network resource parameter of the target network, the heartbeat period of the application program that is to be run in the target network.

With reference to the third aspect or the first implementation manner of the third aspect, in a fourth implementation manner, the network resource parameter includes network quality, bandwidth, or a network charge rate, and the determining unit is further configured to determine and set, according to the network quality of the target network, the running parameter of the application program that is to be run in the target network, or the determining unit is further configured to determine and set, according to the bandwidth of the target network, the running parameter of the application program that is to be run in the target network, or the determining unit is further configured to determine and set, according to the network charge rate of the target network, the running parameter of the application program that is to be run in the target network.

With reference to the third aspect, the first implementation manner of the third aspect, the second implementation manner of the third aspect, the third implementation manner of the third aspect, or the fourth implementation manner of the third aspect, in a fifth implementation manner, the terminal device further includes a connecting unit, where the connecting unit is configured to establish a network connection between the application program and a network server in the target network.

With reference to the third aspect, the first implementation manner of the third aspect, the second implementation manner of the third aspect, the third implementation manner of the third aspect, the fourth implementation manner of the third aspect, or the fifth implementation manner of the third aspect, in a sixth implementation manner, the acquiring unit is further configured to self-detect and acquire the network resource parameter of the network allowed to be accessed, or the acquiring unit is further configured to receive the network resource parameter that is of the network allowed to be accessed and is sent by a network management device; or the acquiring unit is further configured to receive the network resource parameter that is of the network allowed to be accessed and is sent by a terminal device.

With reference to the third aspect, the first implementation manner of the third aspect, the second implementation manner of the third aspect, the third implementation manner of the third aspect, the fourth implementation manner of the third aspect, or the fifth implementation manner of the third aspect, or the sixth implementation manner of the third aspect, in a seventh implementation manner, the network resource parameter includes bandwidth, a network charge rate, or network stability, and the determining unit is further configured to determine, from the network allowed to be accessed and according to the bandwidth of the network allowed to be accessed, a network with largest bandwidth as the target network to be switched to, or the determining unit is further configured to determine, from the network allowed to be accessed and according to the network charge rate of the network allowed to be accessed, a network with a lowest charge as the target network to be switched to, or the determining unit is further configured to determine, from the network allowed to be accessed and according to the network stability of the network allowed to be accessed, a network with highest stability as the target network to be switched to.

According to a fourth aspect, an embodiment of the present disclosure further provides a terminal device, where the terminal device includes, an acquiring unit configured to acquire a network resource parameter of a network allowed to be accessed; a determining unit configured to determine, from the network allowed to be accessed and according to the network resource parameter of the network allowed to be accessed, a target network to be switched to, a sending unit configured to send a network resource parameter of the target network to a terminal device, so that the terminal device determines, according to the network resource parameter, a running parameter of an application program that is run on the terminal device, and a switching unit configured to switch from a current network to the target network.

With reference to the fourth aspect, in a first implementation manner, the acquiring unit is further configured to self-detect and acquire the network resource parameter of the network allowed to be accessed, or the acquiring unit is further configured to receive the network resource parameter that is of the network allowed to be accessed and is sent by a network management device.

With reference to the fourth aspect or the first implementation manner of the fourth aspect, in a second implementation manner, the network resource parameter includes bandwidth, a network charge rate, or network stability, and the determining unit is further configured to determine, from the network allowed to be accessed and according to the bandwidth of the network allowed to be accessed, a network with largest bandwidth as the target network to be switched to, or the determining unit is further configured to determine, from the network allowed to be accessed and according to the network charge rate of the network allowed to be accessed, a network with a lowest charge as the target network to be switched to; or the determining unit is further configured to determine, from the network allowed to be accessed and according to the network stability of the network allowed to be accessed, a network with highest stability as the target network to be switched to.

It can be learned from the foregoing that according to the network switching method and the terminal device provided in the embodiments of the present disclosure, a network resource parameter of a target network to be switched to is determined before network switching, so that a running parameter of an application program that is to be run in the target network is determined and set according to the network resource parameter of the target network. The network switching method described in the solutions is used to enable the application program to implement, to some extent, seamless network switching.

BRIEF DESCRIPTION OF DRAWINGS

To describe the technical solutions in the embodiments of the present application art more clearly, the following briefly introduces the accompanying drawings required for describing the embodiments or the prior art. The accompanying drawings in the following description show some embodiments of the present application, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Embodiment 1

Figure 1:
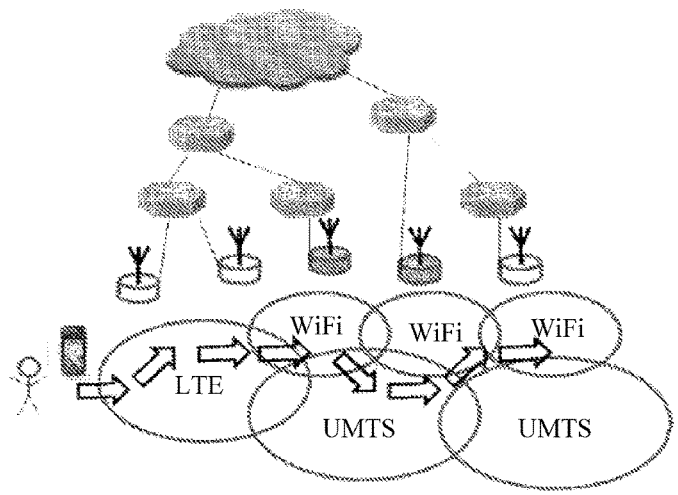
FIG. 1 is a schematic diagram of an application scenario of a network switching method according to an embodiment of the present disclosure.

Referring to FIG. 1, FIG. 1 is a schematic diagram of an application scenario of a network switching method according to an embodiment of the present disclosure. When moving in a direction shown by arrows in FIG. 1, a terminal device needs to pass through five different mobile communications networks and may perform network switching for four times. As shown in FIG. 1, overlapping areas exist between the mobile communications networks, and when passing through the overlapping areas, the terminal device may select one of networks that cover the overlapping areas for access. For example, overlapping areas exist among a long term evolution (LTE) network, an universal mobile telecommunications system (UMTS) network, and a WiFi network, and then when moving from the LTE network to an overlapping area, the terminal device may select one network of the LTE network, the UMTS network, and the WiFi network to perform network switching and access, for example, select the WiFi network as a next access network.

Figure 2A:
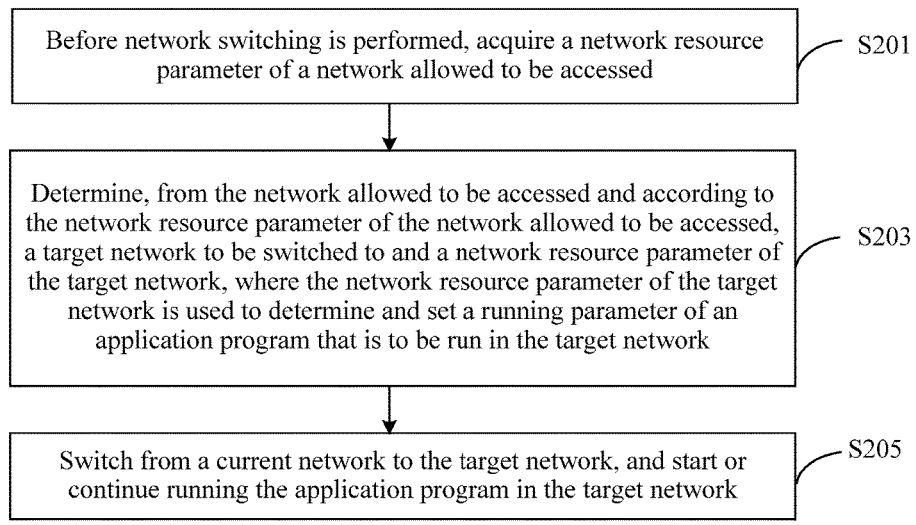
FIG. 2A is a schematic flowchart of a network switching method according to an embodiment of the present disclosure.

Further, referring to FIG. 2A, FIG. 2A is a schematic flowchart of a network switching method according to an embodiment of the present disclosure. The terminal device in the application scenario shown in FIG. 1 may perform network switching by using the network switching method described in this embodiment of the present disclosure. The network switching method provided in this embodiment of the present disclosure may be applied to a computer network system and various communications systems. The computer system may be located in one physical host, or may be distributed and located in multiple physical hosts. Furthermore, the computer system may be located in one or more terminals whose types include a computer, a portable computer, a handheld device (such as a mobile phone and a personal digital assistant), a server, and the like. The various communications systems are, for example, a global system for mobile communications (GSM) system, a code division multiple access (CDMA) system, a wideband code division multiple access (WCDMA) system, a general packet radio service (GPRS), a LTE system, a LTE frequency division duplex (FDD) system, a LTE time division duplex (TDD) system, an universal mobile telecommunications system UMTS, and a worldwide interoperability for microwave access (WiMAX) communications system.

It should be further understood that in this embodiment of the present disclosure, the terminal device may be referred to as a terminal, a mobile station (MS), a mobile terminal, and the like. The user equipment may communicate with one or more core networks by using a radio access network (RAN). For example, the terminal device may be a mobile phone (or referred to as a "cellular" phone), or a computer with a mobile terminal. For example, the terminal device may also be a portable, pocket-sized, handheld, computer built-in, or in-vehicle mobile apparatus, which exchanges voice and/or data with the radio access network.

Referring to FIG. 2A, FIG. 2A is a schematic flowchart of a network switching method according to an embodiment of the present disclosure, where the method includes:

S201: Before network switching is performed, acquire a network resource parameter of a network allowed to be accessed.

If the terminal device detects in real time all wireless communications networks that cover the terminal device, and selects one of the all wireless communications networks as a target network according to a certain rule, the network allowed to be accessed refers to the all wireless communications networks. If the terminal device moves from a place A to a place B, and a network that covers the place A cannot cover the place B, the terminal device needs to select, based on a certain rule, one of all wireless communications networks that cover the place B as the target network to be switched to. Therefore, it can be learned that network switching may occur when the terminal device moves from one wireless communications network to another wireless communications network, or may occur when the terminal device is covered by multiple wireless communications networks, and performance of a wireless communications network in which the terminal device is currently located is poorer than performance of another wireless communications network that covers the terminal device. Referring to the schematic diagram of the application scenario shown in FIG. 1, when the terminal device moves from an area covered by the LTE to an area co-covered by the WiFi and the UMTS, the terminal device determines, according to a certain rule by detecting network resource parameters of the WiFi and the UMTS, one of the WiFi and the UMTS as the target network.

It should be noted that the network resource parameter may be set by a user that uses the terminal device, or may be set by default by an operating system of the terminal device. The network resource parameter may include but is not limited to an Internet Protocol (IP) address, a network type, network bandwidth, network quality, and a charge status that are of the target network, or may only be one or more of the IP address, the network type, the network bandwidth, the network quality, and the charge status that are of the target network.

It is worth noting that the acquiring a network resource parameter of a network allowed to be accessed may be self-detecting and acquiring, by the terminal device, the network resource parameter of the network allowed to be accessed, or may be receiving, by the terminal device, the network resource parameter that is of the network allowed to be accessed and is sent by a network management device (or a network server), or receiving, by the terminal device, the network resource parameter that is of the network allowed to be accessed and is sent by a terminal device of a communication peer.

S203: Determine, from the network allowed to be accessed and according to the network resource parameter of the network allowed to be accessed, a target network to be switched to and a network resource parameter of the target network, where the network resource parameter of the target network is used to determine and set a running parameter of an application program that is to be run in the target network.

Further, when the network resource parameter includes bandwidth, a network with largest bandwidth may be determined, from the network allowed to be accessed and according to the bandwidth of the network allowed to be accessed, as the target network to be switched to, when the network resource parameter includes a network charge rate, a network with a lowest charge may be determined, from the network allowed to be accessed and according to the network charge rate of the network allowed to be accessed, as the target network to be switched to, or when the network resource parameter includes network stability, a network with highest stability may be determined, from the network allowed to be accessed and according to the network stability of the network allowed to be accessed, as the target network to be switched to. Certainly, when the target network is determined from the network allowed to be accessed and according to the network resource parameter of the network allowed to be accessed, the network resource parameter that may be based on includes but is not limited to the foregoing bandwidth, network charge rate, or network stability, and may further include a network type, and the like, which is not limited in the present disclosure. All network resource parameters that can be used to determine the target network from the network allowed to be accessed fall within the protection scope of the present disclosure and are not listed one by one herein again.

S205: Switch from a current network to the target network, and run the application program in the target network.

It is worth noting that after the network resource parameter of the target network is determined in step 203, before network switching occurs, the application program may be run in a manner that adapts to the network resource parameter of the target network, or at a same time when network switching occurs, the application program is run in a manner that adapts to the network resource parameter of the target network, that is, the application program changes a running manner of the application program at a same time when network switching occurs, so as to adapt to a network status of the target network, or after network switching occurs, actually after accessing the target network, the application program is run in a manner that adapts to the network resource parameter of the target network.

Figure 2B:
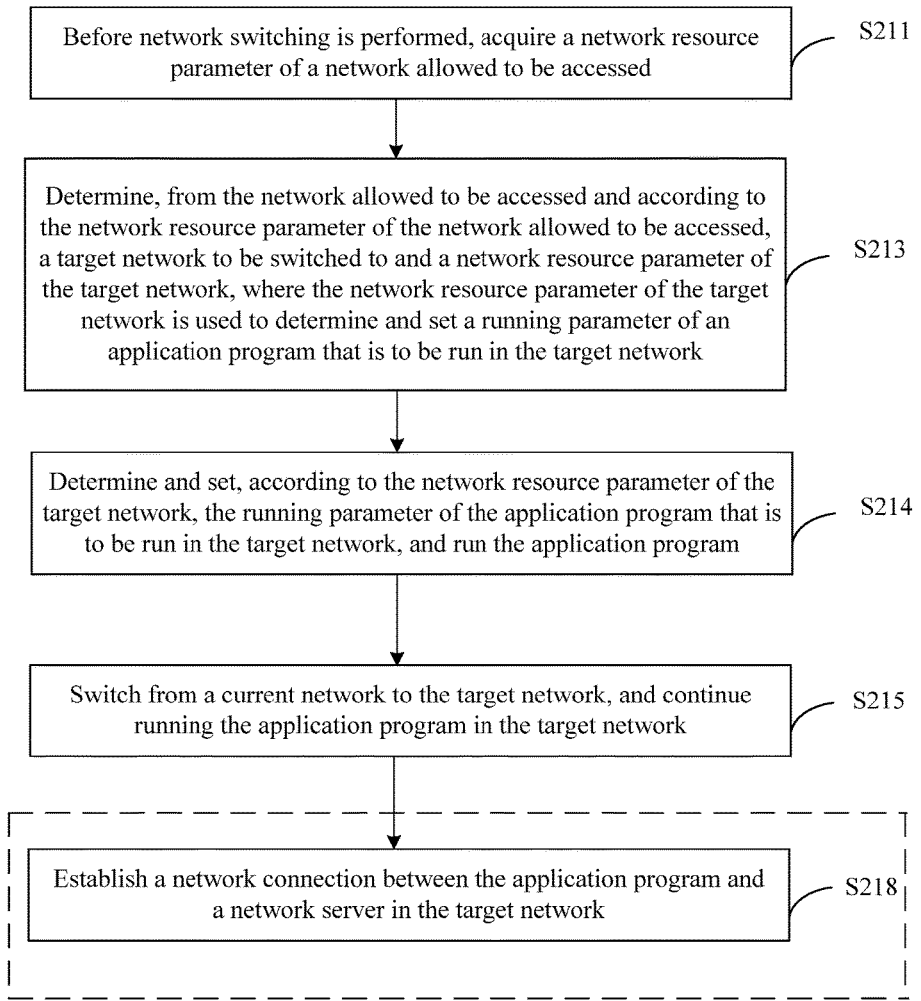
FIG. 2B is a schematic flowchart of a network switching method according to an embodiment of the present disclosure.

As another embodiment of the present disclosure, refer to a schematic flowchart of a network switching method shown in FIG. 2B, which further includes:

S214: Determine and set, according to the network resource parameter of the target network, the running parameter of the application program that is to be run in the target network.

It should be noted that, a common embodiment of the application program refers to an application program that is run on the terminal device and needs to use network communications, such as a video viewing application including Youku, Sohu, IQIYI, and the like, a video communications application including QQ, MSN, and the like, a voice call application including QQ, WeChat, and the like. Furthermore, the application program may be all application programs that are run on the terminal device and need to use network communications, or may be some application programs that are run on the terminal device and need to use network communications. It is worth noting that the some application programs that are run on the terminal device and need to use network communications may be specified by the user that uses the terminal device, or may be set by default by the operating system of the terminal device.

Furthermore, the reason to determine the running parameter of the application program that is run in the target network is that the running parameter of the application program that is run on the terminal device varies with a network status that the application program is in. For example, if bandwidth of a current network in which a Youku video player is located becomes relatively small compared with that at a last moment, and the Youku video player no longer supports high definition video playback, the application changes from high definition playback to standard definition playback.

It is worth noting that the determining and setting, according to the network resource parameter of the target network, the running parameter of the application program that is to be run in the target network includes the following cases. If network quality of the target network is deteriorated, bandwidth of the target network is reduced, or a charge of the target network is increased compared with those of the current network in which the terminal device is located, resolution or a heartbeat period of the application program that is run in the target network is lower than resolution or a heartbeat period of the application program that is run in the current network, and accordingly, if the network quality of the target network is improved, the bandwidth of the target network becomes large, or the charge of the target network is reduced compared with those of the current network in which the terminal device is located, the resolution or the heartbeat period of the application program that is run in the target network is higher than the resolution or the heartbeat period of the application program that is run in the current network. It should be noted that the network resource parameter includes but is not limited to the foregoing network quality, bandwidth, or network charge rate, and may further include a network type, network stability, and the like, which is not limited in the present disclosure. All network resource parameters that may implement the network switching method in this embodiment of the present disclosure fall within the protection scope of the present disclosure and are not listed one by one herein again.

It should be noted that for an application program in which interrupt may occur after switching is performed, the network switching method described in this embodiment of the present disclosure further includes, generating visual prompt information and outputting the prompt information to a user interface of the terminal device.

Certainly, the network switching method shown in FIG. 2B further includes steps S211, S213, and S215, which are respectively corresponding to the steps S201, S203, and S205 in FIG. 2A, and therefore, for specific content of the steps S211, S213, and S215, reference may be made to the foregoing embodiment, and details are not described herein again.

As yet another embodiment of the present disclosure, refer to FIG. 2B, which further includes, S218: Establish a network connection between the application program and a network server in the target network.

Furthermore, after the application program is switched to the target network, if the IP address of the target network is different from an IP address of the current network, the network connection between the application program and the network server in the target network needs to be further re-established within a certain time period.

It can be learned from the foregoing that according to the network switching method provided in this embodiment of the present disclosure, a target network to be switched to and a network resource parameter of the target network have been determined before network switching occurs, so that an application program determines and sets, according to the network resource parameter of the target network, a running parameter that is run in the target network. This solution can be used to directly determine, according to the network resource parameter of the target network, the running parameter that is of the application program and adapts to the target network, so as to enable the application program to implement seamless network switching to some extent.

Furthermore, for that before network switching occurs, the running parameter of the application program that is run in the target network is determined and set according to the network resource parameter of the target network, the running parameter when the application program is run in the target network has been determined and set before a network is switched to the target network, and therefore after network switching occurs, the application program can be run by directly using the running parameter of the application program, so that the application program can smoothly transit from a current network to the target network, implementing seamless network switching.

Embodiment 2

Figure 3:
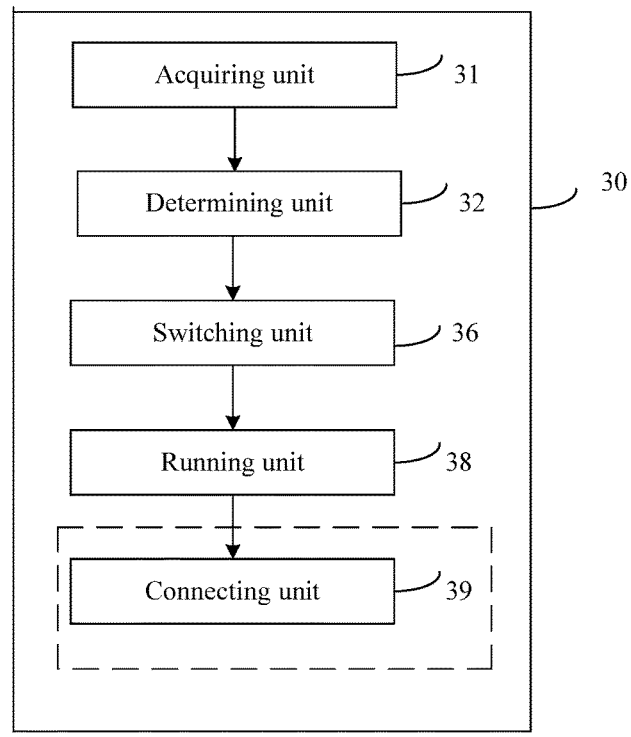
FIG. 3 is a schematic structural diagram of a terminal device according to an embodiment of the present disclosure.

Referring to FIG. 3, FIG. 3 is a terminal device 30 according to an embodiment of the present disclosure, where the terminal device 30 may be applied to the application environment shown in FIG. 1, and further, the terminal device 30 includes:

An acquiring unit 31 is configured to acquire a network resource parameter of a network allowed to be accessed.

It is worth noting that the acquiring unit 31 is further configured to self-detect the network resource parameter of the network allowed to be accessed, or receive the network resource parameter that is of the network allowed to be accessed and is sent by a network management device, or receive the network resource parameter that is of the network allowed to be accessed and is sent by a terminal device of a communication peer.

Furthermore, the network resource parameter may be set by a user that uses the terminal device, or may be set by default by an operating system of the terminal device. The network resource parameter may include but is not limited to an IP address, a network type, network bandwidth, network quality, and a charge status that are of a target network, or may only be one or more of the IP address, the network type, the network bandwidth, the network quality, and the charge status that are of the target network.

It should be noted that if the terminal device detects in real time all wireless communications networks that cover the terminal device, and selects one of the all wireless communications networks as the target network according to a certain rule, the network allowed to be accessed refers to the all wireless communications networks. If the terminal device moves from a place A to a place B, and a network that covers the place A cannot cover the place B, the terminal device needs to select, based on a certain rule, one of all wireless communications networks that cover the place B as the target network to be switched to.

A determining unit 32 is configured to determine, from the network allowed to be accessed and according to the network resource parameter of the network allowed to be accessed, a target network to be switched to and a network resource parameter of the target network, where the network resource parameter of the target network is used to determine and set a running parameter of an application program that is to be run in the target network.

Furthermore, when the network resource parameter includes bandwidth, the determining unit 32 may determine, from the network allowed to be accessed and according to the bandwidth of the network allowed to be accessed, a network with largest bandwidth as the target network to be switched to. When the network resource parameter includes a network charge rate, the determining unit 32 may determine, from the network allowed to be accessed and according to the network charge rate of the network allowed to be accessed, a network with a lowest charge as the target network to be switched to, or when the network resource parameter includes network stability, the determining unit 32 may determine, from the network allowed to be accessed and according to the network stability of the network allowed to be accessed, a network with highest stability as the target network to be switched to. Certainly, when the determining unit 32 determines the target network from the network allowed to be accessed and according to the network resource parameter of the network allowed to be accessed, the network resource parameter that may be based on includes but is not limited to the foregoing bandwidth, network charge rate, or network stability, and may further include a network type, and the like, which is not limited in the present disclosure. All network resource parameters that are of the target network and can be determined from the network allowed to be accessed fall within the protection scope of the present disclosure and are not listed one by one herein again.

A switching unit 36 is configured to switch from a current network to the target network.

A running unit 38 is configured to run the application program in the target network.

It is worth noting that after the determining unit 32 determines the network resource parameter of the target network, before network switching occurs, the application program may be run in a manner that adapts to the network resource parameter of the target network, or at a same time when network switching occurs, the application program is run in a manner that adapts to the network resource parameter of the target network, that is, the application program changes a running manner of the application program at a same time when network switching occurs, so as to adapt to a network status of the target network, or after network switching occurs, actually after accessing the target network, the application program is run in a manner that adapts to the network resource parameter of the target network.

As another embodiment of the present disclosure, in the terminal device shown in FIG. 3, the determining unit 32 is further configured to determine and set, according to the network resource parameter of the target network, the running parameter of the application program that is to be run in the target network.

It should be noted that, the network resource parameter includes network quality, bandwidth, or a network charge status, and the determining unit 32 is further configured to determine, according to the network quality of the target network, the running parameter of the application program that is run in the target network, or determine, according to the bandwidth of the target network, the running parameter of the application program that is run in the target network, or determine, according to the network charge status of the target network, the running parameter of the application program that is run in the target network.

It is worth noting that the network resource parameter includes but is not limited to the foregoing network quality, bandwidth, or network charge rate, and may further include a network type, network stability, and the like, which is not limited in the present disclosure. All network resource parameters that can implement the network switching method in this embodiment of the present disclosure fall within the protection scope of the present disclosure and are not listed one by one herein again.

As yet another embodiment of the present disclosure, referring to FIG. 3, the terminal device 30 further includes a connecting unit 39 configured to, after entering the target network, establish a network connection between the application program and a network server.

Furthermore, after the application program is switched to the target network, if the IP address of the target network is different from an IP address of the current network, the connecting unit 39 is configured to re-establish the network connection between the application program and the network server within a certain time period.

During specific implementation, the foregoing units may be implemented as an independent entity, or may be implemented as one or several entities by any combination. In addition, for specific implementation of the foregoing units, reference may be made to the foregoing embodiment, and details are not described herein again.

It can be learned that according to the terminal device provided in this embodiment of the present disclosure, before network switching occurs, the terminal device has determined a target network to be switched to and a network resource parameter of the target network, so as to determine and set, according to the network resource parameter of the target network, a running parameter of an application program that is on the terminal device and is run in the target network. This solution can be used to directly determine, according to the network resource parameter of the target network, the running parameter that is of the application program and adapts to the target network, so as to enable the application program to implement seamless network switching to some extent.

Further, for that before network switching occurs, the running parameter of the application program that is run in the target network is determined and set according to the network resource parameter of the target network, after network switching occurs, the application program may be run by directly using the running parameter of the application program, so that the application program can be relatively smoothly transited from a current network to the target network, implementing seamless network switching.

Embodiment 3

Figure 4:
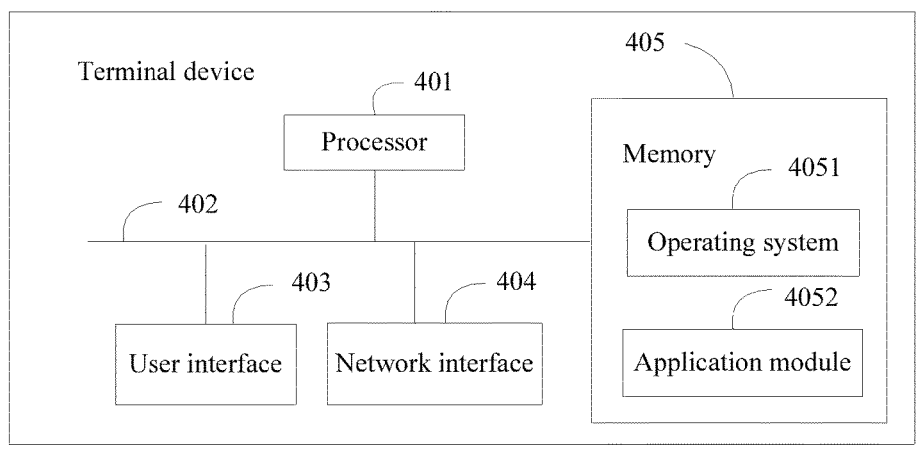
FIG. 4 is a schematic structural diagram of a terminal device according to an embodiment of the present disclosure.

Referring to FIG. 4, FIG. 4 is a schematic structural diagram of another terminal device according to an embodiment of the present disclosure, where the terminal device may be similarly applied to the application environment shown in FIG. 1. As shown in FIG. 4, the terminal device may include at least one processor 401 such as a central processing unit (CPU), at least one network interface 404 such as a physical network interface controller (NIC) or another user interface 403, a memory 405, and at least one communications bus 402.

The communications bus 402 is configured to implement connection and communication between these components.

The network interface 404 is configured to implement connection and communication between the physical host and a network. For example, the network interface 404 may be configured to be connected to a device such as a physical NIC and/or a physical switch.

Optionally, the user interface 403 may include a monitor, a keypad, or another click device such as a mouse cursor, a trackball, a touchpad, or a touchscreen.

The memory 405 may include a high-speed random access memory (RAM), and may also include a non-volatile memory, such as at least one magnetic disk memory. Optionally, the memory 405 may further include at least one storage apparatus far from the foregoing processor 401.

In some implementation manners, the memory 405 stores the following elements: an executable module or a data structure, or a subset of the executable module or the data structure, or an extension set of the executable module or the data structure, an operating system 4051, which includes various system programs and is configured to implement various basic services and process a hardware-based task, and an application module 4052, which includes various application programs and is configured to implement various application services.

The application module 4052 includes but not limited to an acquiring unit, a determining unit, a switching unit, a running unit, and the like.

Furthermore, the processor 401 is configured to acquire a network resource parameter of a network allowed to be accessed; determine, from the network allowed to be accessed and according to the network resource parameter of the network allowed to be accessed, a target network to be switched to and a network resource parameter of the target network, where the network resource parameter of the target network is used to determine and set a running parameter of an application program that is to be run in the target network, and switch from a current network to the target network, and run the application program in the target network.

Further, after determining the network resource parameter of the target network and before switching from the current network to the target network, the processor 401 is further configured to determine and set, according to the network resource parameter of the target network, the running parameter of the application program that is to be run in the target network.

It is worth noting that, the running parameter of the application program includes resolution, and the processor 401 is further configured to determine and set, according to the network resource parameter of the target network, the resolution of the application program that is to be run in the target network, where the application program includes a video type application that uses network communications, or the running parameter of the application program includes a heartbeat period, and the processor 401 is further configured to determine and set, according to the network resource parameter of the target network, the heartbeat period of the application program that is to be run in the target network. The network resource parameter includes network quality, bandwidth, or a network charge status, and the processor 401 is further configured to determine and set, according to the network quality of the target network, the running parameter of the application program that is to be run in the target network, or determine and set, according to the bandwidth of the target network, the running parameter of the application program that is to be run in the target network, or determine and set, according to the network charge status of the target network, the running parameter of the application program that is to be run in the target network.

Further, the processor 401 is further configured to establish a network connection between the application program and a network server in the target network.

It should be noted that the processor 401 is further configured to self-detect and acquire the network resource parameter of the network that can be accessed, or receive the network resource parameter that is of the network that can be accessed and is sent by a network management device, or receive the network resource parameter that is of the network that can be accessed and is sent by a terminal device of a communication peer.

Further, when the network resource parameter includes bandwidth, a network charge rate, or network stability, the processor 401 is further configured to determine, from the network allowed to be accessed and according to the bandwidth of the network allowed to be accessed, a network with largest bandwidth as the target network to be switched to, or determine, from the network allowed to be accessed and according to the network charge rate of the network allowed to be accessed, a network with a lowest charge as the target network to be switched to; or determine, from the network allowed to be accessed and according to the network stability of the network allowed to be accessed, a network with highest stability as the target network to be switched to.

For specific implementation of the foregoing devices, reference may be made to the foregoing embodiment, and details are not described herein again.

It can be learned from the foregoing that before network switching occurs, the terminal device provided in this embodiment of the present disclosure has determined a target network to be switched to and a network resource parameter of the target network, so as to determine and set, according to the network resource parameter of the target network, a running parameter of an application program that is on the terminal device and is run in the target network. This solution can be used to directly determine, according to the network resource parameter of the target network, the running parameter that is of the application program and adapts to the target network, so as to enable the application program to implement seamless network switching to some extent.

Further, for that before network switching occurs, the running parameter of the application program that is run in the target network is determined and set according to the network resource parameter of the target network, after network switching occurs, the application program may be run by directly using the running parameter of the application program, so that the application program is relatively smoothly transited from a current network to the target network, implementing relatively seamless network switching.

Embodiment 4

Figure 5:
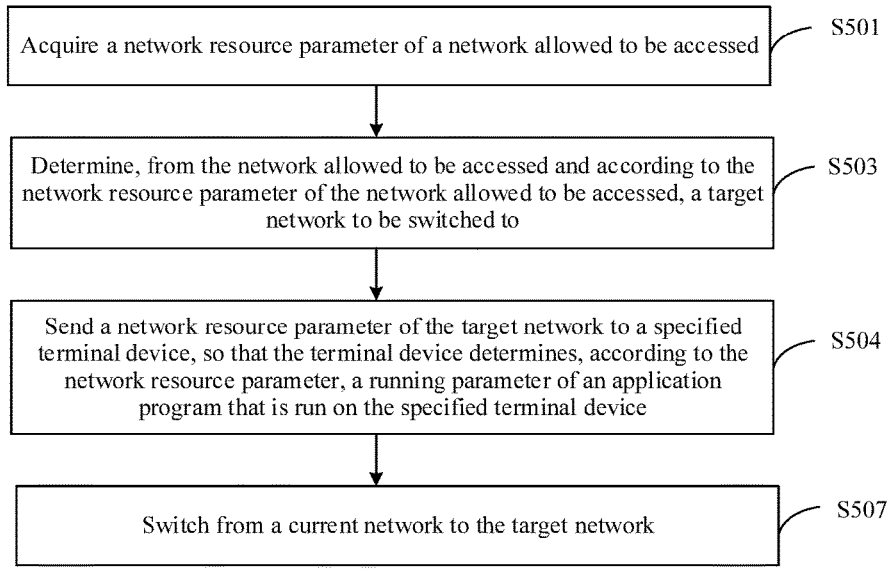
FIG. 5 is a schematic flowchart of a network switching method according to an embodiment of the present disclosure.

Referring to FIG. 5, FIG. 5 is a schematic flowchart of a switching notifying method according to an embodiment of the present disclosure. The switching notifying method provided in this embodiment of the present disclosure may be similarly applied to the application scenario shown in FIG. 1. Furthermore, the switching notifying method provided in this embodiment of the present disclosure may also be similarly applied to a computer network system and various communications systems. The computer system may be located in one physical host, or may be distributed and located in multiple physical hosts. Furthermore, the computer system may be located in one or more terminals whose types include a computer, a portable computer, a handheld device (such as a mobile phone and a PAD), a server, and the like. The various communications systems are, for example, a GSM system, a CDMA system, a WCDMA system, a GPRS, a LTE system, a LTE FDD system, a LTE TDD system, a UMTS, and a WiMAX communications system. It should be further understood that in this embodiment of the present disclosure, the terminal device may be referred to as a terminal, a mobile station, a mobile terminal, and the like. The user equipment may communicate with one or more core networks by using a RAN. For example, the terminal device may be a mobile phone (or referred to as a "cellular" phone), or a computer with a mobile terminal. For example, the terminal device may also be a portable, pocket-sized, handheld, computer built-in, or in-vehicle mobile apparatus, which exchanges voice and/or data with the RAN.

As shown in FIG. 5, FIG. 5 is a schematic flowchart of a pre-switching notifying method according to an embodiment of the present disclosure, where the method includes:

S501: Acquire a network resource parameter of a network allowed to be accessed.

If the terminal device detects in real time all wireless communications networks that cover the terminal device, and selects one of the all wireless communications networks as a target network according to a certain rule, the network allowed to be accessed refers to the all wireless communications networks. If the terminal device moves from a place A to a place B, and a network that covers the place A cannot cover the place B, the terminal device needs to select, based on a certain rule, one of all wireless communications networks that cover the place B as the target network to be switched to. Therefore, it can be learned that network switching may occur when the terminal device moves from one wireless communications network to another wireless communications network, or may occur when the terminal device is covered by multiple wireless communications networks, and performance of a wireless communications network in which the terminal device is currently located is poorer than performance of another wireless communications network that covers the terminal device. Referring to the schematic diagram of the application scenario shown in FIG. 1, when the terminal device moves from an area covered by the LTE to an area co-covered by the WiFi and the UMTS, the terminal device determines, according to a certain rule by detecting network resource parameters of the WiFi and the UMTS, one of the WiFi and the UMTS as the target network.

It should be noted that the network resource parameter may be set by a user that uses the terminal device, or may be set by default by an operating system of the terminal device. The network resource parameter may include but is not limited to an IP address, a network type, network bandwidth, network quality, and a charge status that are of the target network, or may only be one or more of the IP address, the network type, the network bandwidth, the network quality, and the charge status that are of the target network.

It is worth noting that the acquiring a network resource parameter of a network allowed to be accessed may be self-detecting and acquiring, by the terminal device, the network resource parameter of the network allowed to be accessed, or may be receiving, by the terminal device, the network resource parameter that is of the network allowed to be accessed and is sent by a network management device (or a network server), or receiving, by the terminal device, the network resource parameter that is of the network allowed to be accessed and is sent by a terminal device of a communication peer.

S503: Determine, from the network allowed to be accessed and according to the network resource parameter of the network allowed to be accessed, a target network to be switched to.

Further, when the network resource parameter includes a bandwidth, a network with largest bandwidth may be determined, from the network allowed to be accessed and according to the bandwidth of the network allowed to be accessed, as the target network to be switched to. When the network resource parameter includes a network charge rate, a network with a lowest charge may be determined, from the network allowed to be accessed and according to the network charge rate of the network allowed to be accessed, as the target network to be switched to, or when the network resource parameter includes network stability, a network with highest stability may be determined, from the network allowed to be accessed and according to the network stability of the network allowed to be accessed, as the target network to be switched to. Certainly, when the target network is determined from the network allowed to be accessed and according to the network resource parameter of the network allowed to be accessed, the network resource parameter that may be based on includes but is not limited to the foregoing bandwidth, network charge rate, or network stability, and may further include a network type, and the like, which is not limited in the present disclosure. All network resource parameters that are of the target network and can be determined from the network allowed to be accessed fall within the protection scope of the present disclosure and are not listed one by one herein again.

S504: Send a network resource parameter of the target network to a specified terminal device, so that the specified terminal device determines, according to the network resource parameter, a running parameter of an application program that is run on the specified terminal device.

It is worth noting that the specified terminal device refers to a terminal device that can be communicated with and connected to, and may be all terminal devices that can be communicated with and connected to, or may be some terminal devices that can be communicated with and connected to, and the specified terminal device may be set by default by the system, or may be manually set by the user.

It should be noted that, the application program refers to an application program that is run on the terminal device and needs to use network communications, such as a video viewing application including Youku, Sohu, IQIYI, and the like, a video communications application including QQ, MSN, and the like, a voice call application including QQ, WeChat, and the like. In addition, the application program may be all application programs that are run on the terminal device and need to use network communications, or may be some application programs that are run on the terminal device and need to use network communications. It is worth noting that the some application programs that are run on the terminal device and need to use network communications may be specified by the user that uses the terminal device, or may be set by default by the operating system of the terminal device.

It is worth noting that the determining, according to the network resource parameter, the running parameter of the application program that is run on the terminal device includes the following cases: If network quality of the target network is deteriorated, the bandwidth of the target network is reduced, or a charge of the target network is increased compared with those of a current network in which the terminal device is located, the specified terminal device may communicate with the terminal device by selecting a communications mode in which a small amount of traffic is consumed, and accordingly, if the network quality of the target network is improved, the bandwidth of the target network becomes large, or the charge of the target network is reduced compared with those of the current network in which the terminal device is located, the specified terminal device may communicate with the terminal device by selecting a communications mode of a high definition video. Furthermore, if the terminal device is switched from a non-IP network (such as a GSM network) to an IP network (such as a WiFi network), the specified terminal device may communicate with the terminal device by selecting an instant messaging mode such as QQ or SKYPE, and accordingly, if the terminal device is switched from an IP network (such as a WiFi network) to a non-IP network (such as a GSM network), the specified terminal device may communicate with the terminal device by selecting an short message service (SMS) message and the like. It should be noted that the network resource parameter includes but is not limited to the foregoing network quality, bandwidth, or network charge rate, and may further include a network type, network stability, and the like, which is not limited in the present disclosure. All network resource parameters that can implement the network switching method in this embodiment of the present disclosure fall within the protection scope of the present disclosure and are not listed one by one herein again.

S507: Switch from a current network to the target network.

It can be learned from the step that the sending the network resource parameter of the target network to the specified terminal device occurs before network switching actually occurs.

It can be learned from the foregoing that according to the pre-switching notifying method described in this embodiment of the present disclosure, before network switching actually occurs, a terminal device sends a network resource parameter of a target network to a terminal device, so that the terminal device communicates with the terminal device by selecting a communications mode that adapts to a network status of the target network. Therefore, communication between the terminal device and the terminal device is not affected when network switching occurs in the terminal device. The pre-switching notifying method provided in this embodiment of the present disclosure can implement that communication between terminal devices is not affected by network switching, or implement seamless network switching in communication between terminal devices.

Embodiment 5

Figure 6:
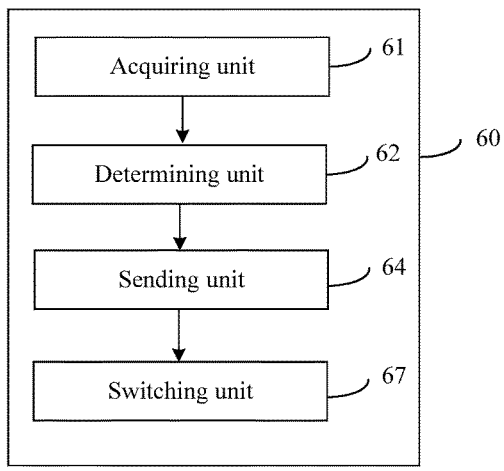
FIG. 6 is a schematic structural diagram of a terminal device according to an embodiment of the present disclosure.

Referring to FIG. 6, FIG. 6 is a schematic structural diagram of a terminal device 60 according to an embodiment of the present disclosure, where the terminal device may also be applied to the schematic diagram of the application scenario shown in FIG. 1. Furthermore, the terminal device 60 includes:

An acquiring unit 61 is configured to acquire a network resource parameter of a network allowed to be accessed.

It is worth noting that the acquiring unit 61 is further configured to self-detect the network resource parameter of the network allowed to be accessed, or receive the network resource parameter that is of the network allowed to be accessed and is sent by a network management device or receive the network resource parameter that is of the network allowed to be accessed and is sent by a terminal device of a communication peer.

Furthermore, the network resource parameter may be set by a user that uses the terminal device, or may be set by default by an operating system of the terminal device. The network resource parameter may include but is not limited to an IP address, a network type, network bandwidth, network quality, and a charge status that are of a target network, or may only be one or more of the IP address, the network type, the network bandwidth, the network quality, and the charge status that are of the target network.

It should be noted that if the terminal device detects in real time all wireless communications networks that cover the terminal device, and selects one of the all wireless communications networks as the target network according to a certain rule, the network allowed to be accessed refers to the all wireless communications networks. If the terminal device moves from a place A to a place B, and a network that covers the place A cannot cover the place B, the terminal device needs to select, based on a certain rule, one of all wireless communications networks that cover the place B as the target network to be switched to.

A determining unit 62 is configured to determine, from the network allowed to be accessed and according to the network resource parameter of the network allowed to be accessed, a target network to be switched to.

Furthermore, when the network resource parameter includes a bandwidth, the determining unit 62 may determine, from the network allowed to be accessed and according to the bandwidth of the network allowed to be accessed, a network with largest bandwidth as the target network to be switched to. When the network resource parameter includes a network charge rate, the determining unit 62 may determine, from the network allowed to be accessed and according to the network charge rate of the network allowed to be accessed, a network with a lowest charge as the target network to be switched to, or when the network resource parameter includes network stability, the determining unit 62 may determine, from the network allowed to be accessed and according to the network stability of the network allowed to be accessed, a network with highest stability as the target network to be switched to. Certainly, when the determining unit 62 determines the target network from the network allowed to be accessed and according to the network resource parameter of the network allowed to be accessed, the network resource parameter that may be based on includes but is not limited to the foregoing bandwidth, network charge rate, or network stability, and may further include a network type, and the like, which is not limited in the present disclosure. All network resource parameters that are of the target network and can be determined from the network allowed to be accessed fall within the protection scope of the present disclosure and are not listed one by one herein again.

A sending unit 64 is configured to send a network resource parameter of the target network to a specified terminal device, so that the specified terminal device determines, according to the network resource parameter, a running parameter of an application program that is run on the specified terminal device.

It is worth noting that the specified terminal device refers to a terminal device that can establish a communication connection, and may be all terminal devices that can establish a communication connection, or may be some terminal devices that can establish a communication connection; and the specified terminal device may be set by default by the system, or may be manually set by the user.

It should be noted that the application program refers to an application program that is run on the specified terminal device and needs to use network communications. In addition, the application program may be all application programs that are run on the specified terminal device and need to use network communications, or may be some application programs that are run on the specified terminal device and need to use network communications. It is worth noting that the some application programs that are run on the specified terminal device and need to use network communications may be specified by the user that uses the specified terminal device, or may be set by default by the operating system of the specified terminal device.

A switching unit 67 is configured to switch from a current network to the target network.

During specific implementation, the foregoing units may be implemented as an independent entity, or may be implemented as one or several entities by any combination. In addition, for specific implementation of the foregoing units, reference may be made to the foregoing embodiment, and details are not described herein again.

It can be learned from the foregoing that according to the terminal device provided in this embodiment of the present disclosure, before network switching actually occurs, the terminal device sends a network resource parameter of a target network to a specified terminal device, so that the specified terminal device communicates with the terminal device by selecting a communications mode that adapts to a network status of the target network. Therefore, communication between the terminal device and the specified terminal device is not affected when network switching occurs in the terminal device, that is, it is ensured that the terminal device can keep communication with the specified terminal device when the terminal device performs network switching.

Embodiment 6

Figure 7:
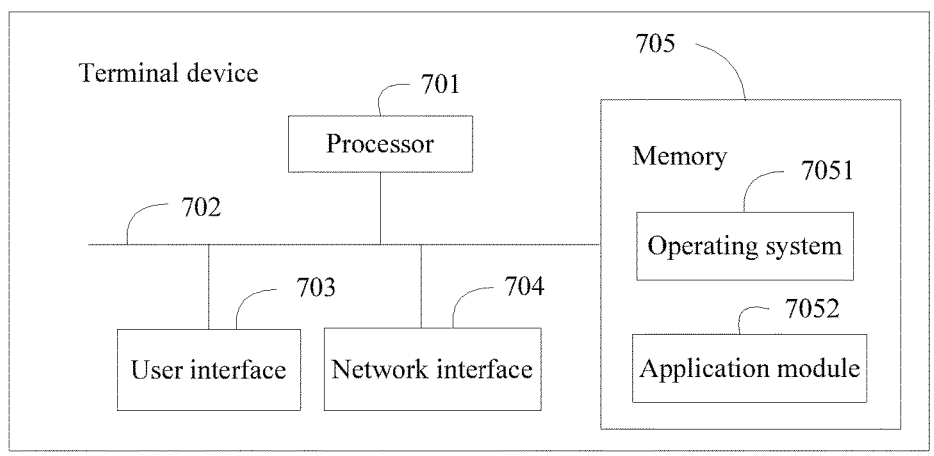
FIG. 7 is a schematic structural diagram of another terminal device according to an embodiment of the present disclosure.

Referring to FIG. 7, FIG. 7 is a schematic structural diagram of another terminal device according to an embodiment of the present disclosure. The terminal device may also be applied to the schematic diagram of the application scenario shown in the FIG. 1. As shown in FIG. 7, the terminal device may include at least one processor 701 such as a CPU, at least one network interface 704 such as a physical NIC or another user interface 703, a memory 705, and at least one communications bus 702.

The communications bus 702 is configured to implement connection and communication between the components.

The network interface 704 is configured to implement connection and communication between the physical host and a network. For example, the network interface 704 may be configured to be connected to a device such as a physical NIC and/or a physical switch.

Optionally, the user interface 703 may include a monitor, a keypad, or another click device such as a mouse cursor, a trackball, a touchpad, or a touchscreen.

The memory 705 may include a high-speed RAM, and may also include non-volatile memory, such as at least one magnetic disk memory. Optionally, the memory 705 may further include at least one storage apparatus far from the foregoing processor 701.

In some implementation manners, the memory 705 stores the following elements: an executable module or a data structure, or a subset of the executable module or the data structure, or an extension set of the executable module or the data structure, an operating system 7051, which includes various system programs and is configured to implement various basic services and process a hardware-based task, and an application module 7052, which includes various application programs and is configured to implement various application services.

The application module 7052 includes but is not limited to a determining unit, a sending unit, a switching unit, and the like.

The processor 701 is configured to acquire a network resource parameter of a network allowed to be accessed, determine, from the network allowed to be accessed and according to the network resource parameter of the network allowed to be accessed, a target network to be switched to send a network resource parameter of the target network to a specified terminal device, so that the specified terminal device determines, according to the network resource parameter, a running parameter of an application program that is run on the specified terminal device, and switch from the current network to the target network.

It should be noted that the processor 701 is further configured to self-detect the network resource parameter of the network that can be accessed, or receive the network resource parameter that is of the network that can be accessed and is sent by a network management device. The network resource parameter includes bandwidth, a network charge rate, or network stability. The processor 701 is further configured to determine, from the network allowed to be accessed and according to the bandwidth of the network allowed to be accessed, a network with largest bandwidth as the target network to be switched to. The processor 701 is further configured to determine, from the network allowed to be accessed and according to the network charge rate of the network allowed to be accessed, a network with a lowest charge as the target network to be switched to. The processor 701 is further configured to determine, from the network allowed to be accessed and according to the network stability of the network allowed to be accessed, a network with highest stability as the target network to be switched to.

For specific implementation of the foregoing devices, reference may be made to the foregoing embodiment, and details are not described herein again.

It can be learned from the foregoing that according to the terminal device provided in this embodiment of the present disclosure, before network switching actually occurs, the terminal device sends a network resource parameter of a target network to a specified terminal device, so that the specified terminal device communicates with the terminal device by selecting a communications mode that adapts to a network status of the target network. Therefore, communication between the terminal device and the specified terminal device is not affected when network switching occurs in the terminal device, that is, it is ensured that the terminal device can keep communication with the specified terminal device when the terminal device performs network switching.

The described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments. In addition, in the accompanying drawings of the apparatus embodiments provided by the present disclosure, connection relationships between modules indicate that the modules have communication connections with each other, which may be further implemented as one or more communications buses or signal cables. A person of ordinary skill in the art may understand and implement the embodiments of the present disclosure without creative efforts.

Based on the description of the foregoing implementation manners, a person skilled in the art may clearly understand that the plotting apparatus according to embodiments of the present disclosure may be implemented by software in addition to necessary universal hardware, or by dedicated hardware, including a dedicated integrated circuit, a dedicated central processing unit (CPU), a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A network switching method, comprising:
  receiving, by a first mobile terminal from a second mobile terminal of a communication peer, a network resource parameter of a network allowed to be accessed before network switching is performed;
  determining, by the first mobile terminal, a target network to be switched to and a network resource parameter of the target network from the network allowed to be accessed and according to the network resource parameter of the network allowed to be accessed received from the second terminal of the communication peer, wherein the network resource parameter of the target network is used to set a running parameter of an application program that is to be run in the target network, wherein the running parameter includes a heartbeat frequency of the application program, and wherein the network resource parameter of the target network includes a charge rate and a network type of the target network;
  setting, based on the charge rate of the target network being lower than a charge rate of a current network, the heartbeat frequency of the application program to a first heartbeat frequency when the application program is run in the target network, wherein the heartbeat frequency of the application program is set to a second heartbeat frequency that is lower than the first heartbeat frequency when the application program is run in the current network;
  sending an indication of the network type of the target network to a third mobile terminal, wherein a network type of the current network is a non-internet protocol (IP) network and the network type of the target network is an IP network;
  switching from the current network to the target network;
  starting or continuing to run the application program in the target network; and
  receiving, from the third mobile terminal, a message of an IP instant messaging service instead of a message of a non-IP short message service (SMS) based on sending the indication of the network type of the target network to the third mobile terminal.

2. The network switching method according to claim 1, wherein before the switching from the current network to the target network, the method further comprises:
  running the application program; and
  continuing to run the application program in the target network after switching from the current network to the target network.

3. The network switching method according to claim 1, further comprising:
  establishing a network connection between the application program and a network server in the target network; and
  re-establishing a network connection between the application program and the network server within a certain time period when an IP address of the target network is different than an IP address of the current network.

4. The network switching method according to claim 1, wherein determining the target network to be switched to comprises determining, from the network allowed to be accessed and according to a charge rate of the network allowed to be accessed, a network with a lowest charge rate as the target network to be switched to.

5. A switching notifying method, comprising:
  acquiring, by a first mobile terminal from a second mobile terminal of a communication peer, a network resource parameter of a network allowed to be accessed before network switching;
  determining, by the first mobile terminal, from the network allowed to be accessed and according to the network resource parameter of the network allowed to be accessed acquired from the second terminal of the communication peer, a target network to be switched to and a network resource parameter of the target network, wherein the network resource parameter of the target network is used to set a running parameter of an application program that is to be run in the target network, wherein the running parameter includes a heartbeat frequency of the application program, and wherein the network resource parameter of the target network includes a charge rate and a network type of the target network;

setting, based on the charge rate of the target network being lower than a charge rate of a current network, the heartbeat frequency of the application program to a first heartbeat frequency when the application program is run in the target network, wherein the heartbeat frequency of the application program is set to a second heartbeat frequency that is lower than the first heartbeat period when the application program is run in the current network;

sending, by the first mobile terminal, an indication of the network type of the target network to a specified mobile terminal of a communication peer, wherein a network type of the current network is a non-internet protocol (IP) network and the network type of the target network is an IP network;

switching from the current network to the target network after sending the indication of the network type to the specified mobile terminal; and receiving, from the specified mobile terminal, a message of an IP instant messaging service instead of a message of a non-IP short message service (SMS) based on sending the indication of the network type of the target network to the specified mobile terminal.

6. The switching notifying method according to claim 5, wherein determining the target network to be switched to comprises determining, from the network allowed to be accessed and according to a charge rate of the network allowed to be accessed, a network with a lowest charge rate as the target network to be switched to.

7. A mobile terminal, comprising:
a memory; and
a processor coupled to the memory, wherein the processor is configured to:
   receive, from a second mobile terminal of a communication peer, a network resource parameter of a network allowed to be accessed before network switching is performed;
   determine, from the network allowed to be accessed and according to the network resource parameter of the network allowed to be accessed received from the second mobile terminal of the communication peer, a target network to be switched to and a network resource parameter of the target network, wherein the network resource parameter of the target network is used to determine and set a running parameter of an application program that is to be run in the target network, wherein the running parameter includes a heartbeat frequency of the application program, and wherein the network resource parameter of the target network includes a charge rate and a network type of the target network;
   set, based on the charge rate of the target network being lower than a charge rate of a current network, the heartbeat frequency of the application program to a first heartbeat frequency when the application program is run in the target network, wherein the heartbeat frequency of the application program is set to a second heartbeat frequency that is lower than the first heartbeat frequency when the application program is run in the current network;
   send the network type of the target network to the second mobile terminal, wherein a network type of the current network is a non-internet protocol (IP) network and the network type of the target network is an IP network;
   switch from the current network to the target network;
   start or continue running the application program in the target network; and
   receive, from the second mobile terminal, a message of an IP instant messaging service instead of a message of a non-IP short message service (SMS) based on sending the network type of the target network to the second mobile terminal.

8. The mobile terminal according to claim 7, wherein before switching from the current network to the target network, the processor is further configured to:
   run the application program; and
   continue running the application program in the target network after switching from the current network to the target network.

9. The mobile terminal according to claim 7, wherein the processor is further configured to establish a network connection between the application program and a network server in the target network.

10. The mobile terminal according to claim 7, wherein the processor is further configured to determine, from the network allowed to be accessed and according to a charge rate of the network allowed to be accessed, a network with a lowest charge rate as the target network to be switched to.

11. A mobile terminal, comprising:
a memory; and
a processor coupled to the memory, wherein the processor is configured to:
   acquire, from a second mobile terminal of a communication peer, a network resource parameter of a network allowed to be accessed;
   determine, from the network allowed to be accessed and according to the network resource parameter of the network allowed to be accessed acquired from the second mobile terminal of a communication peer, a target network to be switched to and a network resource parameter of the target network, wherein the network resource parameter of the target network is used to set a running parameter of an application program that is to be run in the target network, wherein the running parameter includes a heartbeat frequency of the application program, and wherein the network resource parameter of the target network includes a charge rate and a network type of the target network;
   set, based on the charge rate of the target network being lower than a charge rate of a current network, the heartbeat frequency of the application program to a first heartbeat frequency when the application program is run in the target network, wherein the heartbeat frequency of the application program is set to a second heartbeat frequency that is lower than the first heartbeat frequency when the application program is run in the current network;
   send an indication of the network type of the target network to a specified mobile terminal of a communication peer, wherein a network type of the current network is a non-internet protocol (IP) network and the network type of the target network is an IP network;
   switch the mobile terminal from the current network to the target network after sending the network type to the specified mobile terminal; and receive, from the specified mobile terminal, a message of an IP instant messaging service instead of a message of a non-IP short message service (SMS) based on sending the indication of the network type of the target network to the specified mobile terminal.

12. The mobile terminal according to claim 11, wherein the processor is further configured to determine, from the network allowed to be accessed and according to a charge rate of the network allowed to be accessed, a network with a lowest charge rate as the target network to be switched to.

* * * * *

UNITED STATES PATENT AND TRADEMARK OFFICE
CERTIFICATE OF CORRECTION

PATENT NO. : 10,045,263 B2
APPLICATION NO. : 14/988956
DATED : August 7, 2018
INVENTOR(S) : Hao Wu, Kangmin Huang and Mingjie Dong It is certified that error appears in the above-identified patent and that said Letters Patent is hereby corrected as shown below:

On the Title Page

Item (30), Line 1: "201310671763" should read "201310671763.4"

Page 2, Item (56), OTHER PUBLICATIONS, Line 4, "Form" should read "From"

Signed and Sealed this
Eighteenth Day of September, 2018

Andrei Iancu
*Director of the United States Patent and Trademark Office*